United States Patent [19]

Barnett

[11] 4,018,337

[45] Apr. 19, 1977

[54] HEAT SHRINK PACKAGING

[75] Inventor: Karl F. Barnett, Bloomfield Hills, Mich.

[73] Assignee: Cadillac Products, Inc., Sterling Heights, Mich.

[22] Filed: Jan. 13, 1975

[21] Appl. No.: 540,697

Related U.S. Application Data

[63] Continuation of Ser. No. 408,309, Oct. 23, 1973, abandoned.

[52] U.S. Cl. .............................. 206/484; 53/30 S; 206/386; 206/391; 206/497; 229/DIG. 12; 428/515

[51] Int. Cl.² ..................................... B65D 65/00

[58] Field of Search ............ 53/305; 206/384, 497; 229/DIG. 12; 428/515, 520

[56] References Cited

UNITED STATES PATENTS

| | | | |
|---|---|---|---|
| 3,294,621 | 12/1966 | Baird, Jr. et al. | 428/520 |
| 3,522,688 | 8/1970 | Kalinoda et al. | 53/30 S |
| 3,607,505 | 9/1971 | Schirmer | 229/DIG. 12 |
| 3,607,602 | 9/1971 | Greskiewicz | 206/497 |
| 3,622,439 | 11/1971 | Manne et al. | 428/515 |

Primary Examiner—William Price
Assistant Examiner—Joseph M. Moy
Attorney, Agent, or Firm—Harness, Dickey & Pierce

[57] ABSTRACT

A method of utilizing a shrink wrap film to shrink wrap or bundle a load of articles or packages having a surface portion formed of the same material as the shrink wrap film. The load is assembled and wrapped with a laminate comprising an outer ply formed of the shrink wrap film and an inner barrier film formed of a material which will not fuse to any part of the load or said portions when subjected to film-shrinking heat. The wrapped load is thereafter heated to shrink the laminate about the load. Also disclosed is the resultant package, as well as several different laminates which may be used.

15 Claims, 5 Drawing Figures

HEAT SHRINK PACKAGING

This is a continuation of application Ser. No. 408,309 filed Oct. 23, 1973, now abandoned.

BACKGROUND AND SUMMARY OF THE INVENTION

There is a growing tendency to package many articles in plastic film type enclosures rather than in cardboard cartons or the like, particularly when there is a shortage of paper products. For example, many canned and bottled food products are now being packaged by placing them on simple cardboard or plastic trays and then passing them through conventional heat shrink apparatus in which they are wrapped in a shrinkable film material, usually polyethylene, which is then heat shrunk in place. This packaging technique is used in cases in which it has been conventional in the past to use cardboard cartons. These individual packages, which may consist of twelve or twenty-four cans or bottles of a product, are then loaded on pallets for shipment. Because they slide relatively easily with respect to one another they must be anchored to the pallet by some suitable means. It is common to do this using shrink wrap palletizing techniques, wherein the pallet and load is enclosed at least in part by a sheet or sleeve or pre-formed enclosure formed of heat shrinkable film and then passed through a shrink tunnel where heat is applied and the film tightly shrunk about the load. One of the most commonly used heat shrink materials for this purpose of polyethylene film, however it has been discovered that when such film is shrunk on loads of individual packages where the packages themselves are wrapped in polyethylene film, the shrinking heat applied in the tunnel causes the outer polyethylene sleeve or bag to fuse to the individual packages on the pallet, thus making it difficult if not impossible to remove the individual packages intact from the pallet when they reach their destination.

It is therefore a primary object of the present invention to provide a packaging system, including method, film and package, which permits utilization of relatively inexpensive and readily available polyethylene as the primary shrink wrap material and which obviates the aforementioned disadvantage of known techniques. A related object resides in the provision of an improved shrink wrap material having greater toughness and strength than the commonly used polyethylene film.

These and other objects of the present invention will become apparent from the following description and appended claims, taken in conjunction with the accompanying drawings.

DETAILED DESCRIPTION OF THE PREFERRED EMBODIMENT

Figure 4:
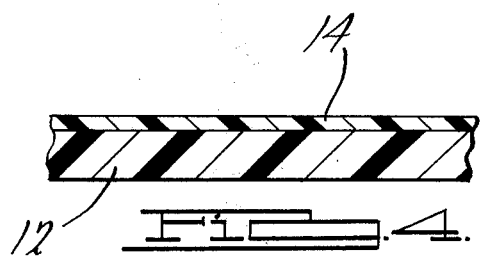
FIG. 4 is a sectional view of the laminate construction of the heat shrinkable film of the present invention.

The benefits of the present invention are derived from the use of a laminate as the heat shrinkable film material. This laminate, shown in cross-section in FIG. 4, comprises a primary ply 12 which is preferably formed of conventionally used heat shrinkable polyethylene film. Layer or ply 12 has laminated thereto a continuous barrier layer or ply 14 which is formed of a material which (a) is heat shrinkable to approximately the same extent as polyethylene under similar heating conditions, (b) will heat seal to itself, (c) will not heat seal or fuse to polyethylene when subjected to film-shrinking temperatures, (d) is of a material similar in flexibility to polyethylene, and (e) can be laminated to polyethylene. One material which has been found to have these characteristics and provide the advantages of the invention, and which is relatively available and economical is polybutylene, a high molecular weight isotactic polymer. This material is a polyolefin and is synthesized from butene-1 monomer. It is the preferred material. Other materials which can have these characteristics are polypropylene, polyvinyl chloride, and Surlyn 1601 resin, the latter being an ionomer resin manufactured by E. I. DuPont de Nemours and Co. Polybutylene is preferred over polypropylene because it is much stronger and tougher and results in a completed wrap of improved toughness and strength, and it is preferred over polyvinyl chloride and Surlyn 1601 because it is less expensive.

The heat shrinkable laminate may be formed in accordance with known laminating techniques, using standard procedures. For example, the barrier ply may be co-extruded with the primary polyethylene ply in either blow form or sheet form, it may be coated on the primary ply with a sheet extruder, or separate film plys may be laminated together using conventional adhesives or other known lamination techniques.

It is important that the barrier ply be continuous and fully coextensive with the primary ply, not only to provide increased strength but also to assure that there are no exposed portions of the primary ply which may fuse to the packages which may constitute the load. On the other hand, it is preferable to provide as thin a barrier layer as is possible to minimize the cost of the laminate, such as when polybutylene is used. In practice it has been found that a layer as thin as one-third of a mil of polybutylene can be coextruded with polyethylene. Because the barrier layer contributes to the strength and toughness of the heat shrunk laminate, less polyethylene may be used for a given application than would otherwise be used in the absence of a tough barrier layer.

Figure 1:
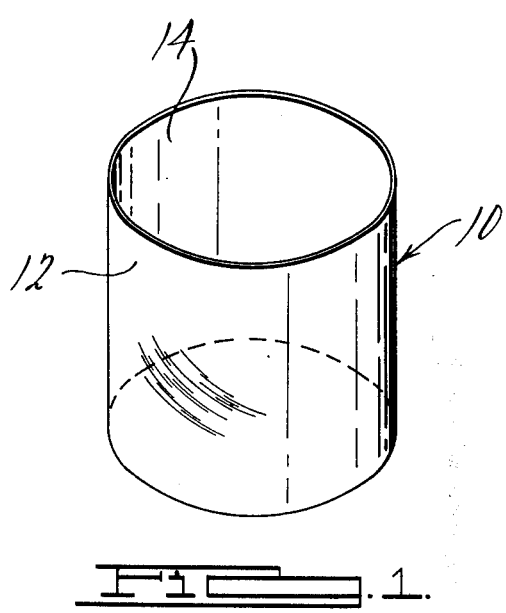
FIG. 1 is a side elevational view of a heat shrinkable film embodying the principles of the present invention and utilized in the form of a tube or sleeve, shown open.
Figure 2:
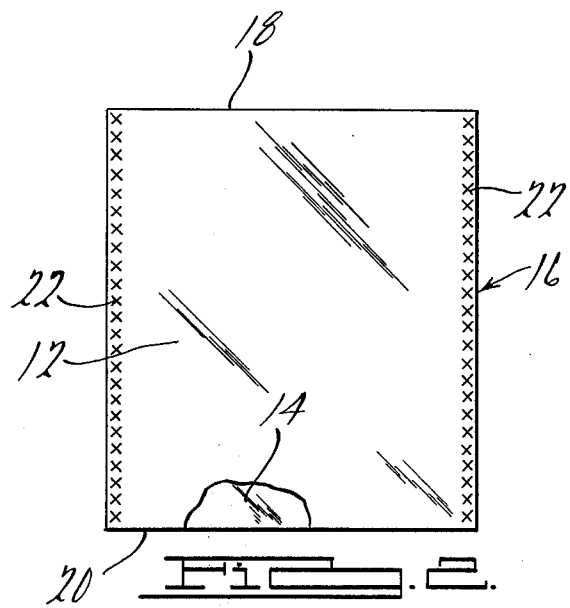
FIG. 2 is a side elevational view of a heat shrinkable film embodying the principles of the present invention and utilized in the form of a center-fold bag, shown in collapsed state.
Figure 3:
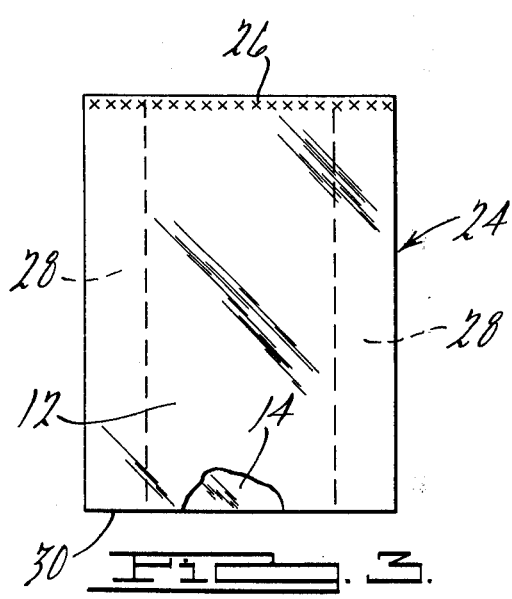
FIG. 3 is a side elevational view of a heat shrinkable film embodying the principles of the present invention and utilized in the form of a gusseted bag, shown in a collapsed state.

The laminate may be used in any conventional form to accomplish the shrink wrapping or bundling of one or more articles. For example, the laminate is shown in FIG. 1 in the form of a tube or sleeve 10 which is adapted to be dropped over a load and then shrunk in place. Alternatively, it can be in the form of a conventional centerfold bag 16, such as shown in FIG. 2, comprising a folded end 18, heat sealed side edges 22 and an open bottom 20. Furthermore, if desired it can be utilized in the form of a conventional gusseted bag, such as shown at 24 in FIG. 3, comprising a heat sealed end 26, integral side gussets 28 and an open bottom 30. Other forms will be apparent to those skilled in the art, such as in sheet form for use in various types of known automatic shrink wrap equipment.

Figure 5:
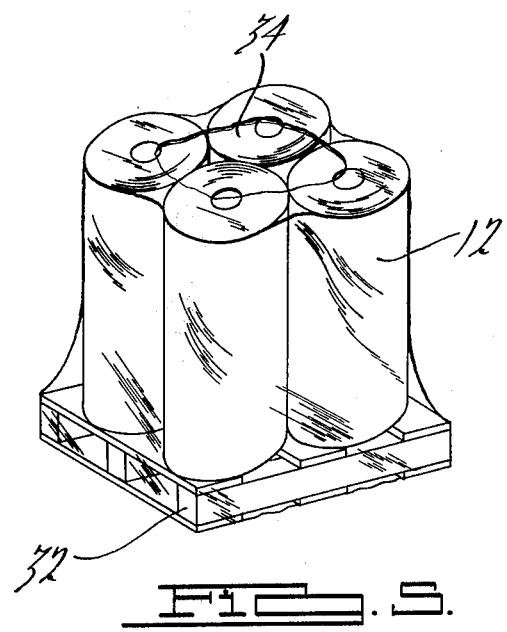
FIG. 5 is a perspective view of a pallet load which has been packaged according to the principles of the present invention.

In FIG. 5 there is illustrated a representative load consisting of a plurality of rolls 34 of polyethylene film material disposed for shipment on a pallet 32 and heat shrunk in place on the pallet by means of the laminate of the present invention utilized in the form of a sleeve or tube. Conventional heat shrinking procedures are used in connection with the laminate of the present invention. Because the inner barrier ply 14 will not fuse to polyethylene, the individual rolls 34 may be easily removed from the pallet after delivery without the entire shrink wrap being fused thereto. The same is true in the case of loads consisting of other types of packages having polyethylene on the outer surfaces thereof.

Thus, there is disclosed in the above description and in the drawing several embodiments of the invention which fully and effectively accomplish the objects thereof. However, it will be apparent that other variations in the details of construction may be indulged in without departing from the sphere of the invention herein described, or the scope of the appended claims.

What is claimed is:

1. A packaged load having an exposed surface thereon formed of a given material, an outer layer of film surrounding said load at least in part and being heat shrunk into relatively intimate engagement therewith said outer layer being formed from a heat-shrinkable material of the same general composition as said given material, and a barrier layer of film material disposed between said exposed surface and said outer layer, said barrier layer being formed from a heat-shrinkable material which will not fuse to said given material when in contact therewith and subjected to film-shrinking temperatures.

2. A packaged load as claimed in claim 1, wherein said barrier layer is laminated to said outer layer.

3. A packaged load as claimed in claim 1, wherein said barrier layer and said outer layer comprise a coextruded laminate.

4. A packaged load as claimed in claim 1, wherein said given material is polyethylene.

5. A packaged load as claimed in claim 1, wherein said barrier layer is polybutylene.

6. A packaged load as claimed in claim 1, wherein said given material is polyethylene and said barrier layer is polybutylene.

7. A packaged load as claimed in claim 1, wherein said barrier layer has heat shrink characteristics similar to those of said outer layer.

8. A packaged load as claimed in claim 1, wherein said barrier layer is formed of a material which is similar in flexibility to that of said outer layer.

9. A packaged load as claimed in claim 1, wherein said barrier layer is formed of a material which can be laminated to said given material.

10. A packaged load as claimed in claim 1, wherein said barrier layer is formed of a material which will heat seal to itself.

11. A packaged load as claimed in claim 1, wherein said load comprises a plurality of individual packages having articles packaged within polyethylene film.

12. A packaged load as claimed in claim 1, wherein said barrier layer is as thin as possible while being continuous and coextensive with said outer layer.

13. A packaged load as claimed in claim 1, wherein said exposed surface is polyethylene film heat-shrunk over at least a portion of said load.

14. A packaged load as claimed in claim 1, wherein said barrier layer is polypropylene.

15. A packaged load as claimed in claim 1, wherein said barrier layer is polyvinyl chloride.

* * * * *